(12) United States Patent
Ekkizogloy et al.

(10) Patent No.: US 7,809,276 B2
(45) Date of Patent: Oct. 5, 2010

(54) INTER-TRANSCEIVER MODULE COMMUNICATION FOR OPTIMIZATION OF LINK BETWEEN TRANSCEIVERS

(75) Inventors: Luke M. Ekkizogloy, San Jose, CA (US); Jayne C. Hahin, Cupertino, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 626 days.

(21) Appl. No.: 11/289,737

(22) Filed: Nov. 29, 2005

(65) Prior Publication Data

US 2006/0133813 A1    Jun. 22, 2006

Related U.S. Application Data

(60) Provisional application No. 60/631,728, filed on Nov. 30, 2004.

(51) Int. Cl.
*H04B 10/00* (2006.01)
*H04B 10/08* (2006.01)

(52) U.S. Cl. .......................... 398/139; 398/135; 398/28

(58) Field of Classification Search ................ 398/135, 398/136, 138, 128, 129, 130, 131, 137, 139, 398/141, 28
See application file for complete search history.

(56) References Cited

U.S. PATENT DOCUMENTS

| 5,546,325 | A | 8/1996 | Aulet et al. | 364/525 |
|---|---|---|---|---|
| 5,969,839 | A | 10/1999 | Yoshida et al. | 359/152 |
| 6,031,645 | A | 2/2000 | Ichikawa | 359/113 |
| 6,246,499 | B1 | 6/2001 | Kunito et al. | 359/161 |
| 6,473,213 | B1 * | 10/2002 | Wandernoth et al. | 398/129 |
| 6,742,154 | B1 * | 5/2004 | Barnard | 714/752 |
| 7,110,678 | B2 * | 9/2006 | Willebrand et al. | 398/115 |
| 7,245,828 | B2 * | 7/2007 | Hauenschild et al. | 398/38 |
| 7,522,514 | B2 * | 4/2009 | Tzannes et al. | 370/210 |
| 2002/0131123 | A1 * | 9/2002 | Clark | 359/154 |
| 2003/0002100 | A1 * | 1/2003 | Izadpanah | 359/124 |
| 2004/0161240 | A1 | 8/2004 | Weber | 398/139 |
| 2004/0184810 | A1 * | 9/2004 | Spilman et al. | 398/139 |
| 2004/0252998 | A1 * | 12/2004 | Schalk et al. | 398/135 |
| 2005/0019036 | A1 * | 1/2005 | Soto et al. | 398/135 |

* cited by examiner

*Primary Examiner*—M. R. Sedighian
(74) *Attorney, Agent, or Firm*—Workman Nydegger

(57) ABSTRACT

A method for two or more optical transceivers coupled to each other by an optical link to optimize communication over the optical link. A first transceiver generates electrical data that represents an operational parameter for optimization. The transceiver then converts the electrical data into an optical signal and transmits the optical signal over the optical link to a second transceiver. The second transceiver recovers the electrical data from the optical signal and uses the recovered electrical data to change characteristics of the optical signal transmitted by the second transceiver.

14 Claims, 3 Drawing Sheets

INTER-TRANSCEIVER MODULE COMMUNICATION FOR OPTIMIZATION OF LINK BETWEEN TRANSCEIVERS

CROSS-REFERENCE TO RELATED APPLICATIONS

This application claims the benefit of U.S. Provisional Application No. 60/631,728, filed Nov. 30, 2004, which is incorporated herein by reference in its entirety.

BACKGROUND OF THE INVENTION

1. The Field of the Invention

The present invention relates generally to optical transceivers. More specifically, the present invention relates to optimizing communication between two or more optical transceivers through use of the optical link.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

During communication between two or more optical transceivers, it is often desirable to optimize the communication between the transceivers. Performing the optimization may often lead to the most efficient communication possible (or at least to more efficient communication) between the transceivers. However, the optical transceivers are often only coupled to one another by an optical link. What would be advantageous is to optimize communication between two or more optical transceivers using the optical link.

BRIEF SUMMARY OF THE INVENTION

The forgoing problems with the prior state of the art are overcome by the principles of the present invention, which relates to methods for optimizing communication in an optical network. The optical network includes at least two optical transceivers coupled to each other by an optical link.

A first optical transceiver generates an electrical signal containing optimization data. This signal is then converted by the first optical transceiver into an optical signal that is transmitted over the optical link to a second optical transceiver. The second optical transceiver recovers the optimization data from the optical signal. The second optical transceiver uses the recovered optimization data to optimize its transmission characteristics.

Accordingly, there are many advantages to the principles of the present invention. For example, the optical link may be utilized in the optimization process. This removes the need for external hardware such as a host computing system to perform the optimization. In addition, having the optical transceivers perform the optimization themselves may lead to a more efficient and faster optimization process.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to a method for two or more optical transceivers coupled to each other by an optical link to optimize communication over the optical link. A first transceiver generates electrical data that represents an operational parameter for optimization. The transceiver then converts the electrical data into an optical signal and transmits the optical signal over the optical link to a second transceiver. The second transceiver recovers the electrical data from the optical signal and uses the recovered electrical data to change characteristics of the optical signal transmitted by the second transceiver. An example operational environment will first be described. Then, the operation in accordance with the invention will be described with respect to the operational environment.

Figure 1:
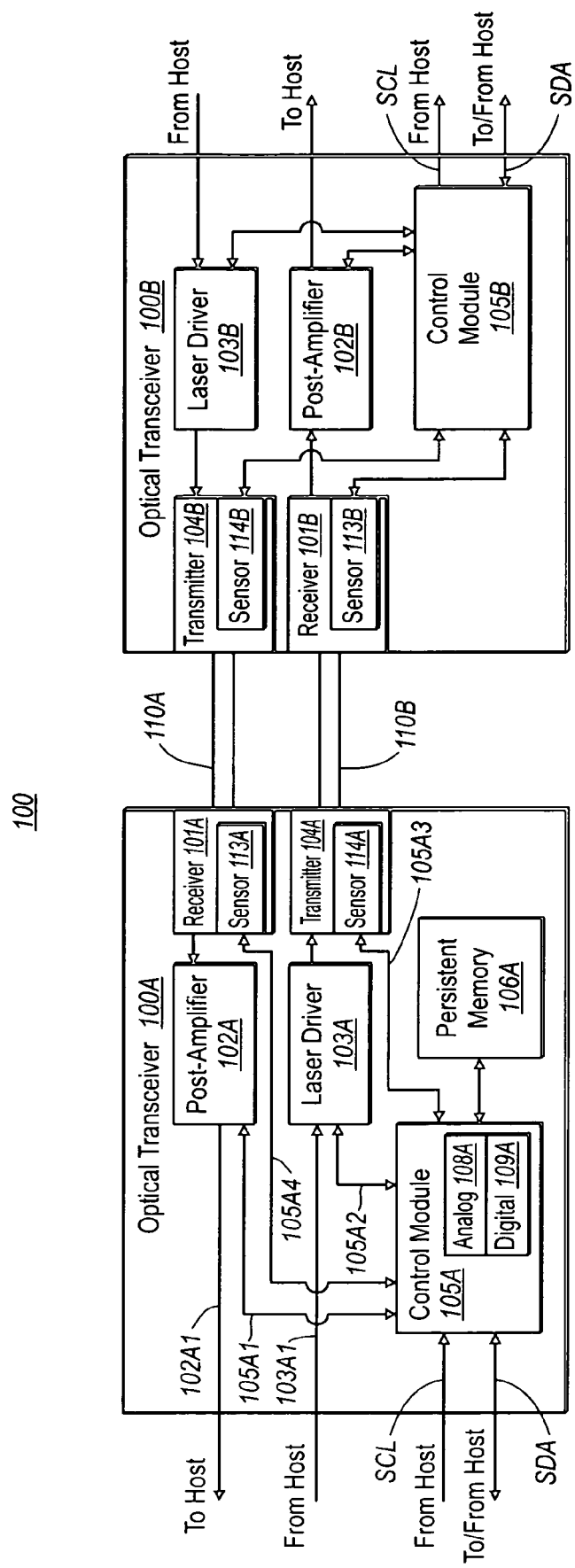
FIG. 1 schematically illustrates an example of an optical network that may implement features of the present invention.

FIG. 1 illustrates an environment 100 in which the principles of the present invention may be employed. The environment 100 includes optical transceivers 100A and 100B, which will now be described. While the optical transceivers 100A and 100B will be described in some detail, the optical transceivers 100A and 100B are described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction.

The optical transceiver 100A receives optical signals transmitted by optical transceiver 100B from fiber 110A using receiver 101A. The receiver 101A acts as an opto-electric transducer by transforming the optical signal into an electrical signal. The receiver 101A provides the resulting electrical signal to a post-amplifier 102A. The post-amplifier 102A amplifies the signal and provides the amplified signal to an external host computing system as represented by arrow 102A1. In one embodiment, the optical transceiver 100A may be a printed circuit board or other components/chips within the host, although this is not required.

The optical transceiver 100A may also receive electrical signals from the host for transmission onto the fiber 110B to the optical transceiver 100B. Specifically, the laser driver 103A receives the electrical signal as represented by the arrow 103A1, and drives the transmitter 104A (e.g., a laser or Light Emitting Diode (LED)) with signals that cause the transmitter 104A to emit onto the fiber 110B optical signals representative of the information in the electrical signal provided by the host. Accordingly, the transmitter 104A serves as an electro-optic transducer.

The behavior of the receiver 101A, the post-amplifier 102A, the laser driver 103A, and the transmitter 104A may vary dynamically due to a number of factors. For example, temperature changes, power fluctuations, and feedback conditions may each affect the performance of these components. Accordingly, the optical transceiver 100A includes a control module 105A, which may evaluate temperature and voltage conditions and other operational circumstances, and receive information from the post-amplifier 102A (as represented by arrow 105A1) and from the laser driver 103A (as represented by arrows 105A2). This allows the control module 105A to optimize the dynamically varying performance, and additionally detect when there is a loss of signal.

Specifically, the control module 105A may counteract these changes by adjusting settings on the post-amplifier 102A and/or the laser driver 103A as also represented by the arrows 105A1 and 105A2. These settings adjustments are quite intermittent since they are only made when temperature or voltage or other low frequency changes so warrant.

The control module 105A may have access to a persistent memory 106A, which in one embodiment, is an Electrically Erasable and Programmable Read Only Memory (EEPROM). Persistent memory 106A may also be any other non-volatile memory source. The persistent memory 106A and the control module 105A may be packaged together in the same package or in different packages without restriction.

Figure 2:
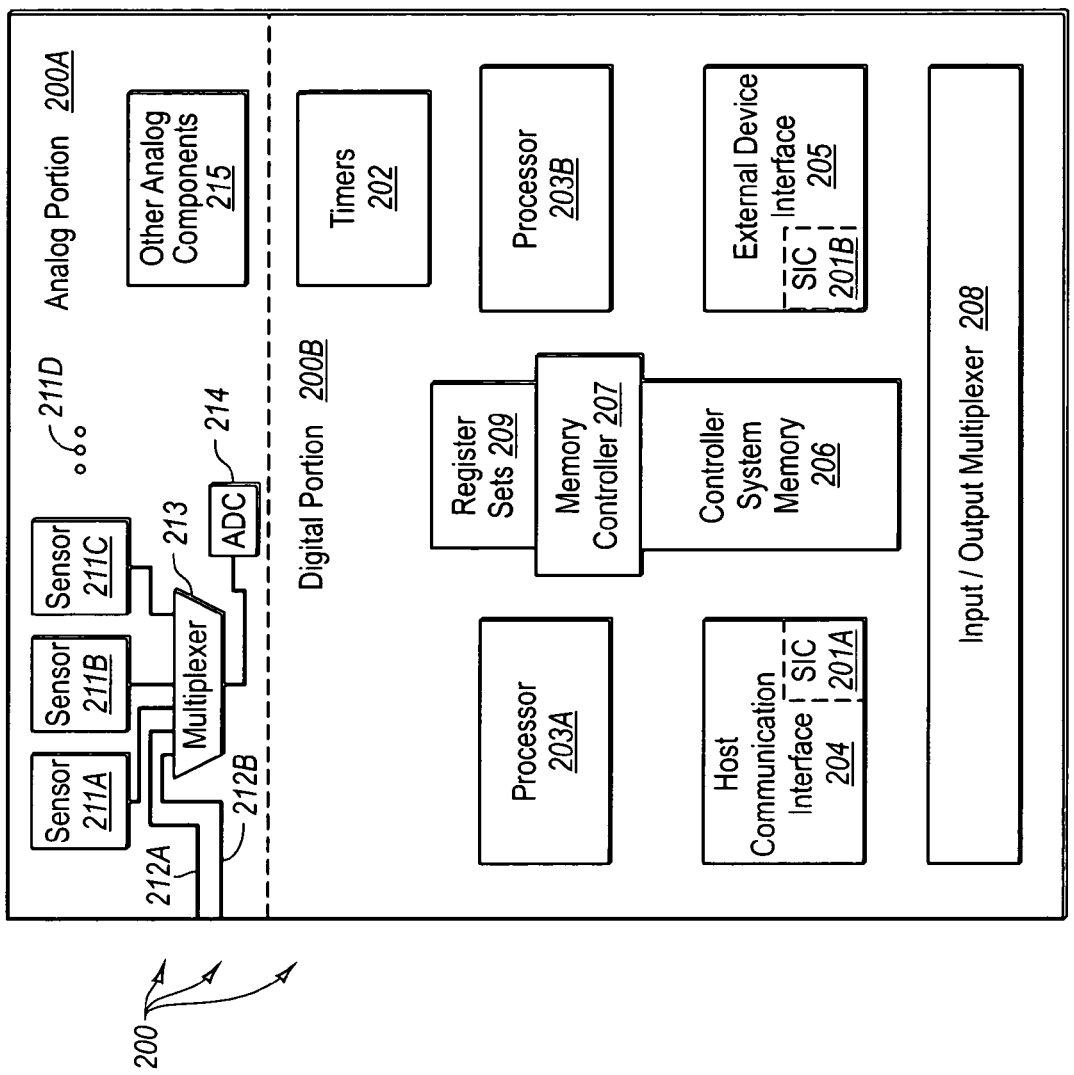
FIG. 2 schematically illustrates an example of a control module of FIG. 1.

The control module 105A includes both an analog portion 108A and a digital portion 109A. Together, they allow the control module to implement logic digitally, while still largely interfacing with the rest of the optical transceiver 100A using analog signals. FIG. 2 schematically illustrates an example 200 of the control module 105A in further detail. The control module 200 includes an analog portion 200A that represents an example of the analog portion 108A of FIG. 1, and a digital portion 200B that represents an example of the digital portion 109A of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host, possibly implemented using a two-wire interface such as I²C shown in FIG. 1 as the serial data (SDA) and serial clock (SCL) lines on the optical transceiver 100A. Other host communication interfaces may also be implemented as well. Data may be provided from the control module 105A to the host using this host communications interface to allow for digital diagnostics and readings of temperature levels, transmit/receiver power levels, and the like. The external device interface 205 is used to communicate with, for example, other modules within the optical transceiver 100A such as, for example, the post-amplifier 102A, the laser driver 103A, or the persistent memory 106A.

The internal controller system memory 206 (not to be confused with the external persistent memory 106A) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100A. Alternatively, the registers may hold data selecting operational parameters for comparison. Additionally, the registers may be memory mapped to the various components of optical transceiver 100A for controlling aspects of the component such as laser bias current or transmit power.

Referring again to FIG. 1, a transceiver 100B is also depicted as part environment 100. Transceiver 100B may be structured the same as transceiver 100A, although this is not required. Specifically, transceiver 100B may have a receiver 101B, a post-amplifier 102B, a laser driver 103B, and a transmitter 104B that have the same functionality as the corresponding components of transceiver 100A. Transceiver 100B may also have a persistent memory. In addition, transceiver 100B may receive signals from a host computing system for transmission by the transmitter and may send received signals to the host. Transceiver 100B may also include a control module 105B that controls the behavior of the transceiver in the same manner as the control module 105A of transceiver 100A. The control module 105B may send control signals to and receive control signals from post-amplifier 102B and laser driver 103B. The control module 105B may have both an analog portion and a digital portion with the same functionality as the corresponding analog and digital portions of the control module 200 depicted in FIG. 2. In addition, the control module 105B may communicate with a host by use of the implemented host interface, such as the I²C interface shown implemented in FIG. 1. Transceiver 100B may transmit data over fiber 110A and may receive data over fiber 110B.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate a method for two or more optical transceivers coupled to each other by an optical link to optimize communication over the optical link. The principles of the present invention will be discussed with reference to the environment described in relation to FIGS. 1 and 2.

Referring again to FIG. 1, a sensor 113A and 113B is shown coupled to receivers 101A and 1011B, respectively. Sensors 113A and 113B may be an out-of-band demodulator, a filter, a photo-diode, or any other type of device capable of detecting and processing an optical or electrical signal. In addition, a sensor 114A and 114B is shown coupled to transmitters 104A and 104B respectively. Sensors 114A and 114B may be a photo-diode or other type of device capable of measuring the transmitted optical power.

Figure 3:
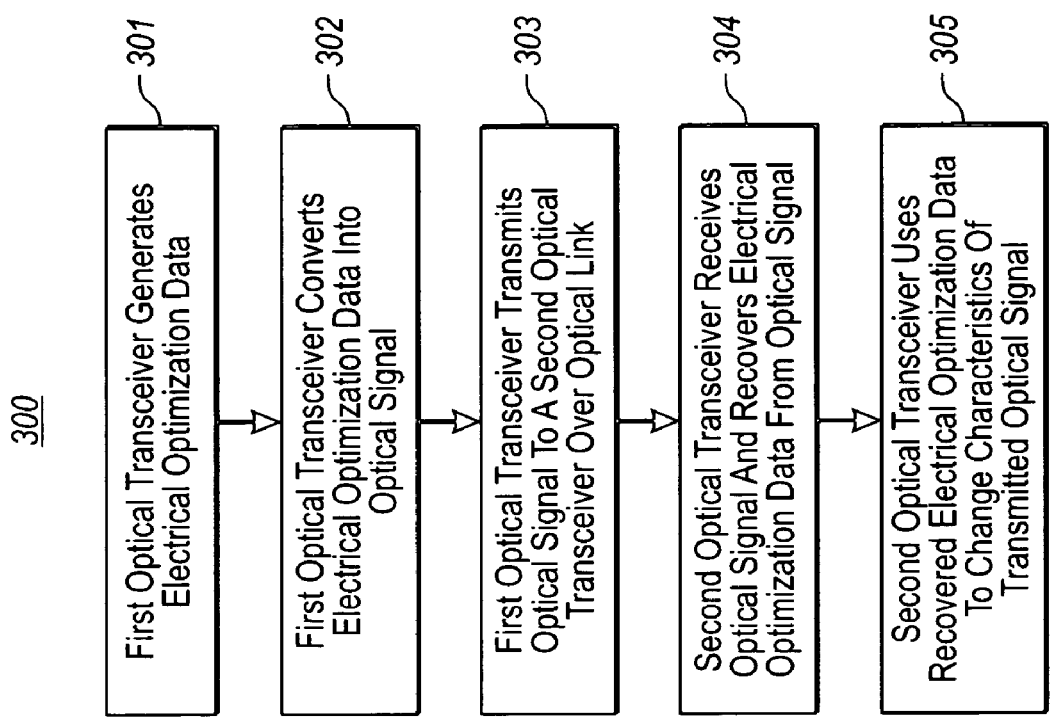
FIG. 3 illustrates a flowchart of a method for two optical transceivers to optimize their communication using an optical link in accordance with the principles of the present invention.

Referring to FIG. 3, a flowchart of a method 300 for two or more optical transceivers coupled to each other by an optical link to optimize communication over the optical link is illustrated. A first optical transceiver generates electrical optimization data (act 301). This optimization data may include data about operational parameters such as transmit and receive power.

For example, suppose in an example embodiment based on the environment of FIGS. 1 and 2 that the optical fibers 110A and 110B connecting transceiver 100A with transceiver 100B were approximately 10 kilometers (Km) in length. Further, suppose that transceiver 100A and transceiver 100B may optimize their communication by determining the exact length of the fibers between them. This determination may be made by the transceivers communicating data representing respective transmit (and potentially) receive powers to each other over the optical link.

To accomplish this optimization (or improvement), transceiver 100A may generate electrical data regarding its transmit power. Specifically, sensor 114A may measure the transmit power and send data representing this transmit portion to control module 105A over connection 105A3, which may be represented by lines 212A or 212B in FIG. 2. The measured transmit power data may be propagated through multiplexer 213 and converted to a digital signal by ADC 214 and then stored in controller system memory 206 or a register in register sets 209. The data representing the measured transmit power is then converted to an analog signal by a digital to analog converter in other analog components 215 and provided to laser driver 103A.

Referring again to the method of FIG. 3, the first optical transceiver converts the electrical optimization data into an optical signal (act 302). This may be accomplished by any technique known to one skilled in the art, whether now existing or later developed, such as double modulation. For example, the electrical optimization data may be modulated onto another signal. The optical signal is then transmitted to second optical transceiver over an optical link that is coupling the two optical transceivers (act 303).

In the example embodiment, laser driver 103A converts the electrical data representing the measured transmit power into an out-of-band signal that is modulated onto a high speed communication signal provided by the host. The out-of-band signal is modulated at a frequency that is much slower than the high-speed signal. The modulation may be accomplished by any modulation technique known to one skilled in the art. The double modulated signal is then converted to an optical signal by the transmitter 104A and transmitted to transceiver 100B over fiber 110B.

Alternatively, there may be a direct conversion of the measured transmit power electrical signal to an optical signal. A direct conversion takes place when transceiver 100A is not also transmitting high speed communication data from the host. In that case, laser driver 103A may send a signal to transmitter 104A for conversion to an optical signal at a frequency that may be detected by a transceiver 100B demodulator.

Referring again to the method of FIG. 3, the second optical transceiver receives the optical signal and recovers the electrical optimization data contained in the optical signal (act 304). The recovery of the data may be accomplished by use of a sensor that is configured to detect the optimization data and recover it from the optical signal. Examples of such a sensor include, but are not limited to, a demodulator, a filter, a photo-diode, or any other sensor capable of reading an electric or optical signal. The electrical optimization data may be recovered from the optical signal by any other method known to those skilled in the art.

As mentioned, in the example embodiment fiber 110B sends the doubled modulated signal or the directly converted signal to receiver 101B, where the double modulated signal or the directly converted signal is recovered from the optical signal and converted into an electrical signal. The post-amplifier 102B extracts the electrical high speed communication signal and may send it to the host. In the case of the data being represented using out-of-band modulation, sensor 113B, which is this case may be an out-of-band demodulator, recovers the transmit power measured by the transceiver 100A by demodulating the out-of-band signal from the high speed communication signal. Sensor 113B then sends the recovered transmit power signal to control module 105B for further processing.

In the direct conversion case, the receiver 101B or post-amplifier 102B or another component may be configured to detect when measured transmit power data is being received, and provide that transmit power data to the control module 105B for further processing. For example, the measured transmit power may be provided at a low frequency in which a binary zero is maintained for a number of normal clock cycles to represent a single binary zero, and in which a binary one is maintained for a number of normal clock cycles to represent a single binary one.

Referring again to FIG. 3, the second optical transceiver uses the recovered electrical optimization data to change characteristics of the optical signal it transmits (act 305). For example, again referring to the example embodiment, the transmit power electrical data signal, whether recovered in a way previously discussed or some other way, is sent to control module 105B. Receiver 100B also measures the power it receives for further use in calculating the length of the fiber link between the transceivers 100A and 100B.

Processors in control module 105B may access and use both the recovered transmit power data (representing the transmit power as measured by the transceiver 100A) and the received power data (representing the receive power as measured by the transceiver 100B) to determine the actual length of the optical fiber connecting transceivers 100A and 100B. Each fiber has its own attenuation characteristics, which are generally known and published by the fiber manufacturers. These attenuation characteristics are often expressed as an attenuation percentage (fraction of power lost) per unit length of fiber. The attenuation percentage varies for different optical wavelengths. The wavelength of the optical transmission is known, and the attenuation characteristics are known. Accordingly, the optical transceiver 100B may use the measured transmit and receive powers, to calculate the actual length of the fiber.

Suppose that the actual length was determined to be 9.85 Km, which is less than the expected 10 Km. The control module 105B processors may determine that a transmit power optimization factor such as the extinction ratio is to be adjusted accordingly. This can be accomplished by adjusting the bias current that drives transmitter 104B and/or the modulation current. Control module 105B would send a signal directing laser driver 103B to adjust the bias and/or modulation current to a level that is more optimum for the 9.85 Km length of fiber.

Transceiver 100B may then generate an electrical signal to inform transceiver 100A that an adjustment has been made to transceiver 100B's extinction ratio. This signal may be converted to an optical signal and transmitted over optical fiber 110A to transceiver 100A by any of the ways previously discussed or in another way. The signal may be provided to control module 105A in the manner described. Control module 105A may then use the information from transceiver 100B to adjust the extinction ratio of transceiver 100A in the manner previously described for transceiver 100B. Transceiver 100A may then repeat the process by communicating its extinction ratio to transceiver 100B over the optical link. This may repeated as necessary until the communication between the transceivers reaches an optimum level. Although optimizing the transmit power of both transceivers was discussed in the examples above, other optimizations may also be performed using the principles of the present invention.

Accordingly, the principles of the present invention relate a method for two or more optical transceivers coupled to each other by an optical link to optimize communication over the optical link. One of the optical transceivers generates electrical optimization data and converts it into an optical signal. The optical signal is then transmitted to the second optical transceiver. The second optical transceiver recovers the electrical optimization data from the optical signal. The second optical transceiver uses the recovered data to perform optimization procedures that change how the transceiver transmits data. This method makes it possible for two transceivers that are only coupled by an optical link to optimize the communication between them. In addition, a host is not needed for the optimization process. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical network environment that includes two or more optical transceivers coupled to each other by one or more optical fibers, a method for optimizing communication over the optical link, the method comprising:

an act of a first optical transceiver generating transmit power data;

an act of the first optical transceiver combining the transmit power data with communication data in an electrical signal;

an act of the first optical transceiver converting the electrical signal into an optical signal;

an act of the first optical transceiver transmitting the optical signal to a second optical transceiver over the one or more optical fibers;

an act of the second optical transceiver receiving the optical signal;

an act of the second optical transceiver recovering the transmit power data from the optical signal;

an act of the second optical transceiver using the recovered transmit power data to change transmission power characteristics of an optical signal transmitted by the second optical transceiver;

an act of the second optical transceiver using the recovered transmit power data and the receive power data to determine a length of at least one of the one or more optical fibers, wherein the second optical transceiver changes the transmission power characteristics of the optical signal transmitted by the second optical transceiver based on the determined length.

2. A method in accordance with claim 1, wherein the second optical transceiver recovers the transmit power data by use of a sensor capable of detecting and processing electrical and optical signals.

3. A method in accordance with claim 2, wherein the sensor includes at least one of an out-of-band demodulator, a filter, and a photo-diode.

4. A method in accordance with claim 1, wherein the second optical transceiver uses the recovered transmit power data to calculate its extinction ratio.

5. A method in accordance with claim 1 further comprising:

an act of the second optical transceiver transmitting to the first optical transceiver over the one or more optical fibers information regarding the change in transmission power characteristics of the optical signals transmitted by the second optical transceiver.

6. A method in accordance with claim 5, wherein the first optical transceiver uses the received information to change characteristics of the optical signal transmitted by the first optical transceiver.

7. A method in accordance with claim 1, wherein the first and second optical transceivers are one of a 1G laser transceiver, a 2G laser transceiver, a 4G laser transceiver, a 8G laser transceiver, or a 10G laser transceiver.

8. A method in accordance with claim 1, wherein the first and second optical transceivers are a laser transceiver suitable for fiber optic links greater than 10G.

9. A method in accordance with claim 1, wherein the first and second optical transceivers are one of a XFP laser transceiver, a SFP laser transceiver, or a SFF laser transceiver.

10. A method in accordance with claim 1, further comprising:

an act of the second optical transceiver recovering the communication data from the optical signal and forwarding the communication data to a host device communicatively coupled to the second optical transceiver.

11. A method in accordance with claim 1, wherein the act of the first optical transceiver combining the transmit power data with the communication data in an electrical signal includes double modulating the transmit power data and the communication data onto the electrical signal.

12. A method in accordance with claim 1, further comprising:

an act of the second optical transceiver generating receive power data, wherein the second optical transceiver changes the transmission power characteristics of the optical signal transmitted by the second optical transceiver based on the receive power data.

13. A method in accordance with claim 12, further comprising:

an act of the first optical transceiver measuring a transmit power level of a signal transmitted to the second optical transceiver to generate the transmit power data; and an act of the second optical transceiver measuring a receiver power level of a signal received from the first optical transceiver to generate the receiver power data.

14. A method in accordance with claim 1, further comprising:

an act of the second optical transceiver using an attenuation characteristic of the at least one optical fiber to determine the length of the at least one optical fiber.

* * * * *